A. J. SILVA.
IMPLEMENT STEERING ATTACHMENT FOR TRACTORS.
APPLICATION FILED MAY 10, 1921.
1,416,989. Patented May 23, 1922.
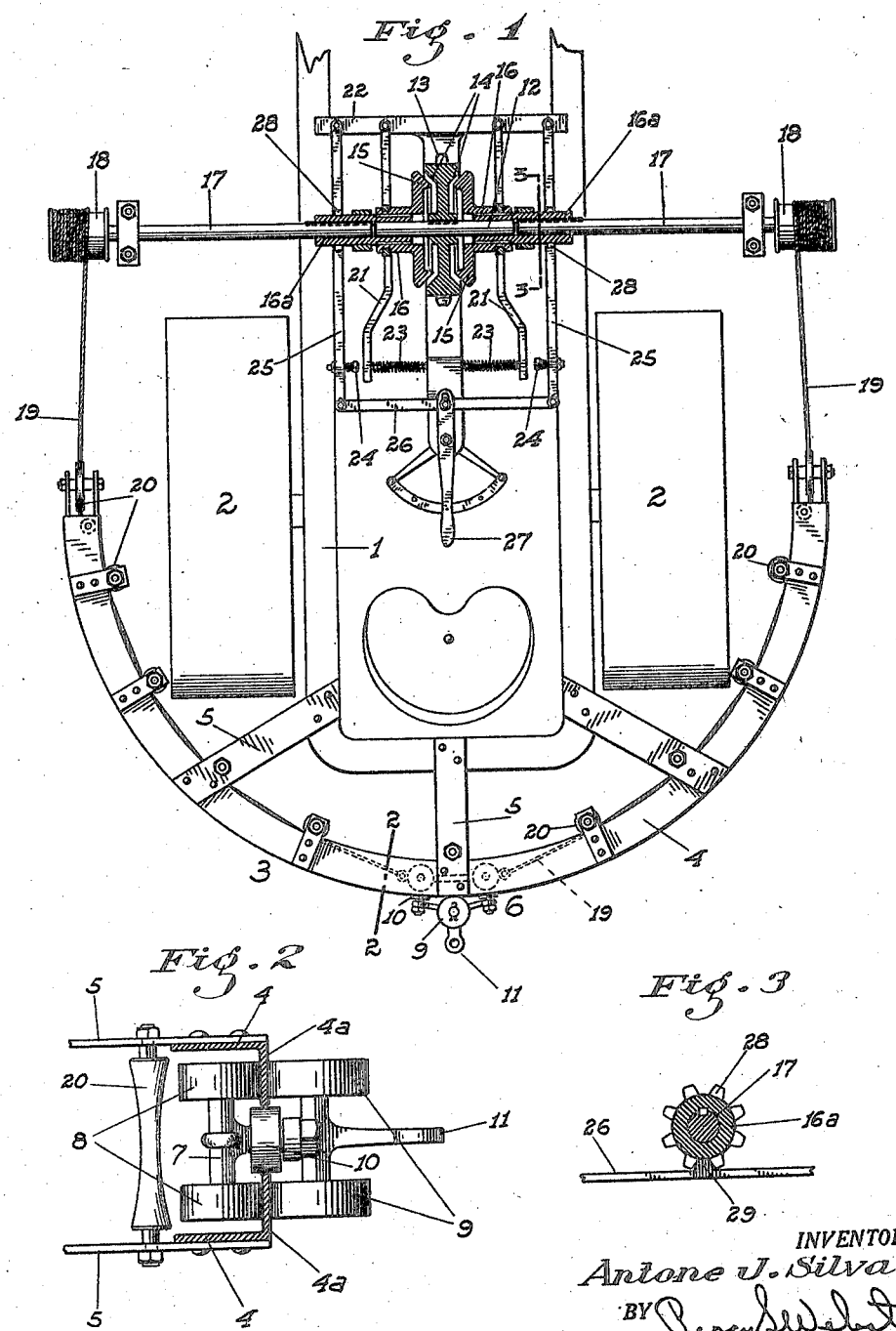

UNITED STATES PATENT OFFICE.

ANTONE J. SILVA, OF MILTON, CALIFORNIA.

IMPLEMENT-STEERING ATTACHMENT FOR TRACTORS.

1,416,989. Specification of Letters Patent. Patented May 23, 1922.

Application filed May 10, 1921. Serial No. 468,388.

*To all whom it may concern:*

Be it known that I, ANTONE J. SILVA, a citizen of the United States, residing at Milton, county of Calaveras, State of California, have invented certain new and useful Improvements in Implement-Steering Attachments for Tractors; and I do declare the following to be a full, clear, and exact description of the same, reference being had to the accompanying drawings, and to the characters of reference marked thereon, which form a part of this application.

This invention relates to improvements in attachments for tractors for the purpose of connecting the drawn vehicle or implement thereto and to cause the said vehicle or implement to follow closely in the path of the tractor when the latter makes a turn, and without any slipping or dragging of the wheels of the drawn member, and without side strains on either the latter or the tractor.

To accomplish the above in a satisfactory manner forms the principal object of my invention, and to this end, I have provided an attachment mounted on the tractor and serving as the drawbar and to which the tongue of the drawn member to the tractor is connected, said attachment being arranged to be moved from one side to the other of the longitudinal center line of the tractor, depending on the direction in which it is desired to turn the tractor, so that the tongue and the steering wheels of the drawn member to which the tongue is connected, will be swivelled to the same side to cause a turning movement to be imparted to the drawn vehicle, so that the latter will describe a curved path of its own volition without being dragged around by the tractor with a side slip of the wheels, which causes undue strain on both vehicles.

Another object of my invention is to provide a means for moving said attachment from side to side with the power of the tractor engine, such means being controlled by the driver of the tractor, so that he is not called upon to exert any physical effort in so doing other than the shifting of a lever to one side or the other.

These objects I accomplish by means of such structure and relative arrangement of parts as will fully appear by a perusal of the following specification and claims.

In the drawings similar characters of reference indicate corresponding parts in the several views.

Fig. 1 is a top plan view of the rear end of a tractor, showing my improved steering attachment.

Fig. 2 is an enlarged fragmentary cross section taken on a line 2—2 of Fig. 1.

Fig. 3 is a similar section taken on a line 3—3 of Fig. 1.

Referring now more particularly to the characters of reference on the drawings, the numeral 1 denotes the frame of the tractor, having supporting wheels or track members 2 at the rear end.

Extending around the rear end of the frame and partly around said wheels or track and positioned a suitable distance from the ground, is a horizontal track 3 preferably formed on a curve whose center is the axis of turning of the tractor with respect to the rear wheels.

This track preferably consists of a pair of vertically spaced angle irons 4, whose vertical legs 4ª face each other in vertical alinement and are on the outer side of the curve. This track is rigidly supported from the frame 1 by braces 5 or otherwise.

Positioned between the two track members and projecting outwardly thereof is a carriage 6 consisting of a frame 7 carrying two vertically positioned pairs of horizontally spaced rollers 8, arranged to ride on the inner faces of the angle-legs 4ª, and a single vertical pair of rollers 9 positioned centrally of the rollers 8 and riding on the outer faces of the legs 4ª.

Another pair of rollers 10 rides between the adjacent edges of the legs 4ª, and a rigid arm 11 projects rearwardly and centrally of the carriage to adapt the same for connection to the tongue of the implement or vehicle being drawn. Thus it will be evident that a very easy riding carriage is provided, which is not apt to bind in any direction, and will move with a minimum of friction.

This carriage is moved from side to side of the tractor, or rather from one end of the track to the other, by the following means:—

Mounted ahead of the track and transversely of the tractor is a shaft 12 keyed onto which is a combined clutch and sprocket or gear wheel 13 driven from the tractor engine, this wheel having a pair of opposed beveled faces 14 to form the female members of a pair of male clutch members 15, one on each side thereof whose hubs 16 are splined on sleeves 16ª which are keyed onto the ends of shafts 17 which lie in continuous alinement with the shaft 12, the sleeves also forming a bearing for the shaft 12, which is turnable therein. On the outer ends of these shafts are drums 18 on which are wound cables 19 which extend and are connected to the opposite ends of the carriage, bearing against various sheaves or rollers 20 suitably arranged and connected to the track along the inner side thereof.

The clutch members 15 are adapted to be either at a time engaged with the main clutch member 13 by means of yokes 21 having connection with the hubs 16 and pivoted at one end to a stationary member 22, the opposite ends being connected to springs 23 acting to hold both yokes and clutch members in neutral position.

The spring-connected ends of these yokes are adapted to be engaged by pins 24 projecting inwardly of levers 25, pivoted onto the member 22 and having a connecting cross-arm 26 at their opposite ends. This arm is shifted one way or the other by a hand actuated lever 27 positioned within reach of the driver of the tractor.

Formed with the hubs 16 in the plane of the levers 25 when the latter are in their neutral position are radially arranged teeth 28, the interstices between any two of which are adapted to receive a lug 29 on each such lever, thereby holding both hubs and the parts connected thereto against any rotative movement when the levers are in neutral position.

In operation, if it is desired to make a turn to the right with the tractor, the wheels of the drawn vehicle are also turned to track in the same direction. The right hand lever 25 is then shifted to the left, which causes the yokes 21 to be moved and the clutch 15 on that side to be engaged with the member 13, which is constantly turning. This imparts movement to the shaft 17 on that side, causing the cable 19 to be wound on the drum, and drawing the carriage along the right hand side of the track.

With the movement of the lever 25, the lug 29 thereon moves to one side of the teeth 28, thus unlocking the sleeve 16ª and allowing the shaft 17 to turn, this unlocking being done before the clutch members are actually engaged.

Since both levers 25, being connected, move together, the left hand lever moves away from its clutch, leaving the same inoperative, and the lug thereon is also disengaged from the sleeve-teeth, leaving the left hand shaft 17 free to turn so that the cable may unwind on that side as it is being wound upon the drum on the other side.

A reverse movement of the levers of course reverses the above movements, and permits the carriage to be returned to a central position, or to be moved around to the other side.

When the carriage has been moved the necessary distance by the rotation of the shaft 17, the clutch is again disengaged, and the levers then engaged with the sleeve teeth, so that the carriage is forced to stay in the position to which it was moved until the driver of the tractor wills otherwise.

The track is preferably centered from the axis of rotation of the tractor so that as the latter turns, the pull on the drawn vehicle will be always about in a direct line with said axis, making the turning operation much easier.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. An implement steering attachment for tractors including a horizontal track fixed on the tractor, a carriage supported and guided by the track and adapted for connection to the tongue of a drawn implement, a power driven shaft, a shaft on each side thereof, and normally disconnected therefrom, means for operatively connecting either at a time of said shafts with the driven shaft, a drum on each shaft, and cables wound on said drums and leading to the opposite ends of the carriage.

2. An implement steering attachment for tractors including a horizontal track fixed on the tractor, a carriage supported and guided by the track and adapted for connection to the tongue of a drawn implement, a power driven shaft, a shaft on each side thereof, and normally disconnected therefrom, a drum on each shaft, cables wound on said drums and leading to the opposite ends of the carriage, clutches between the driven shaft and the drum-shafts, and a commonly actuated means for engaging either at a time of the clutches while the other remains inactive.

3. An implement steering attachment for tractors including a horizontal track fixed on the tractor, a carriage supported and guided by the track and adapted for connecting to the tongue of a drawn implement, a power driven shaft, a shaft on each side thereof, and normally disconnected therefrom, a drum on each shaft, cables wound on said drums and leading to the opposite ends of the carriage, clutches between the driven shaft and the drum-shafts, means for engaging either at a time of the clutches, and means whereby when the clutches are disengaged both the drum-shafts will be locked against rotation.

4. An implement steering attachment for tractors including a horizontal track fixed on the tractor, a carriage supported and guided by the track and adapted for connection to the tongue of a drawn implement, a power driven shaft, a shaft on each side thereof, and normally disconnected therefrom, a drum on each shaft, cables wound on said drums and leading to the opposite ends of the carriage, clutches between the driven shaft and the drum-shafts, and a common means for engaging either at a time of the clutches and for holding the drum-shafts locked against rotation when the clutches are disengaged.

5. An implement steering attachment for tractors including a horizontal track fixed on the tractor, a carriage supported and guided by the track and adapted for connection to the tongue of a drawn implement, a power driven shaft, a shaft on each side thereof, and normally disconnected therefrom, means for operatively connecting either at a time of said shafts with the driven shaft, and means for moving the carriage along the track in one direction with the rotation of the corresponding power-connected shaft.

6. An implement steering attachment for tractors including a horizontal track fixed on the tractor, a carriage supported and guided by the track and adapted for connection to the tongue of a drawn implement, a power driven shaft, a shaft on each side thereof, and normally disconnected therefrom, a drum on each shaft, cables wound on said drums and leading to the opposite ends of the carriage, a double-faced clutch member fixed on the driven shaft, companion clutch members splined on the drum-shafts, yokes connected to said companion members and arranged to normally hold the same disengaged, and a commonly actuated means for moving either yoke to cause its companion clutch member to be engaged with the main clutch without disturbing the inactive position of the other yoke.

7. An implement steering attachment for tractors including a horizontal track fixed on the tractor, a carriage supported and guided by the track and adapted for connection to the tongue of a drawn implement, a power driven shaft, a shaft on each side thereof, and normally disconnected therefrom, a drum on each shaft, cables wound on said drums and leading to the opposite ends of the carriage, a double-faced clutch member fixed on the driven shaft, companion clutch members splined on the drum-shafts, yokes connected to said companion members and arranged to normally hold the same disengaged, levers on opposite sides of the yokes and in alinement therewith, a bar connecting said levers, the bar being arranged to be shifted in either direction, whereby the corresponding lever will contact with the adjacent yoke and force it to move to cause its clutch member to be engaged with the fixed clutch.

8. An implement steering attachment for tractor including a horizontal track fixed on the tractor, a carriage supported and guided by the track and adapted for connection to the tongue of a drawn implement, a power driven shaft, a shaft on each side thereof, and normally disconnected therefrom, a drum on each shaft, cables wound on said drums and leading to the opposite ends of the carriage, a double-faced clutch member fixed on the driven shaft, companion clutch members splined on the drum-shafts, yokes connected to said companion members and arranged to normally hold the same disengaged, levers on opposite sides of the yokes and in alinement therewith, a bar connecting said levers, the bar being arranged to be shifted in either direction, radially positioned teeth on the drum-shafts, and a lug on each lever adapted to fit and be positioned between any two teeth when the levers are in neutral position but to move away from said teeth when the levers are shifted in either direction.

9. An implement steering attachment for tractors comprising a carriage adapted for connection to the tongue of a drawn implement, means on the tractor for supporting and guiding the carriage, a power driven shaft, a pair of independent shafts, means for operatively connecting either at a time of said shafts with the driven shaft, and means operatively connected to said shafts and to the opposite ends of the carriage whereby the latter is moved one way or the other with the rotation of the corresponding shaft.

10. An implement steering attachment for tractors comprising a carriage adapted for connection to the tongue of a drawn implement, means on the tractor for supporting and guiding the carriage, a pair of independent shafts, means operatively connected to said shafts and to the opposite ends of the carriage for causing the latter to be moved one way or the other when the corresponding shaft is rotated, and means for positively rotating either at a time of said shafts.

In testimony whereof I affix my signature.

ANTONE J. SILVA.